United States Patent
Evans et al.

(10) Patent No.: US 8,647,049 B2
(45) Date of Patent: Feb. 11, 2014

(54) GAS TURBINE ENGINE CASING ASSEMBLY

(75) Inventors: Dale E. Evans, Derby (GB); Michael R. Lawson, Derby (GB)

(73) Assignee: Rolls-Royce PLC, London (GB)

( * ) Notice: Subject to any disclaimer, the term of this patent is extended or adjusted under 35 U.S.C. 154(b) by 1000 days.

(21) Appl. No.: 12/726,929

(22) Filed: Mar. 18, 2010

(65) Prior Publication Data

US 2010/0266384 A1 Oct. 21, 2010

(30) Foreign Application Priority Data

Apr. 15, 2009 (GB) .................................. 0906319.9

(51) Int. Cl.
*F01D 21/00* (2006.01)

(52) U.S. Cl.
USPC ............................................................. 415/9

(58) Field of Classification Search
USPC ............................................................. 415/9
See application file for complete search history.

(56) References Cited

U.S. PATENT DOCUMENTS

| | | | |
|---|---|---|---|
| 2,966,333 A | 12/1960 | Flanagan | |
| 3,901,557 A | 8/1975 | Daniels | |
| 3,910,651 A | 10/1975 | Pearce et al. | |
| 5,188,505 A * | 2/1993 | Schilling et al. | 415/9 |
| 6,382,905 B1 * | 5/2002 | Czachor et al. | 415/9 |
| 2004/0146393 A1 * | 7/2004 | Evans et al. | 415/9 |
| 2005/0106002 A1 * | 5/2005 | Gerez et al. | 415/9 |
| 2008/0101917 A1 | 5/2008 | Bart et al. | |

FOREIGN PATENT DOCUMENTS

GB  1 542 654  3/1979

OTHER PUBLICATIONS

Great Britain Search Report issued in Great Britain Patent Application No. 0906319.9 on Aug. 4, 2009.

* cited by examiner

*Primary Examiner* — Nathaniel Wiehe
*Assistant Examiner* — Jeffrey A Brownson
(74) *Attorney, Agent, or Firm* — Oliff, PLC

(57) ABSTRACT

High bypass ratio turbofan propulsion engines are designed with a two-step approach to surviving foreign object damage to the fan assembly. First, a containment system encircling the fan assembly to capture any part of a released fan blade in the event of damage occurring, and two in order to cope with the vibrations resulting from a rotating unbalanced fan assembly the support structure for the bearing of the rotating assembly is constructed with frangible parts to introduce a snubber gap to permit the rotating, unbalanced fan assembly and bearing to orbit thereby to reduce the resulting vibrations. However, in the case of very wide chord fan assemblies, the largest acceptable snubber gap is insufficient to reduce the induced vibrations. The present solution is to incorporate into the containment system, and behind a fan track liner encircling the fan blades, at least one severance member having a cutting edge that will impact the tips of the blades of an orbiting fan assembly thereby to trim the mass distribution of the fan blades in order to reduce the vibrations caused by the out of balance forces.

7 Claims, 2 Drawing Sheets

GAS TURBINE ENGINE CASING ASSEMBLY

Figure 1:
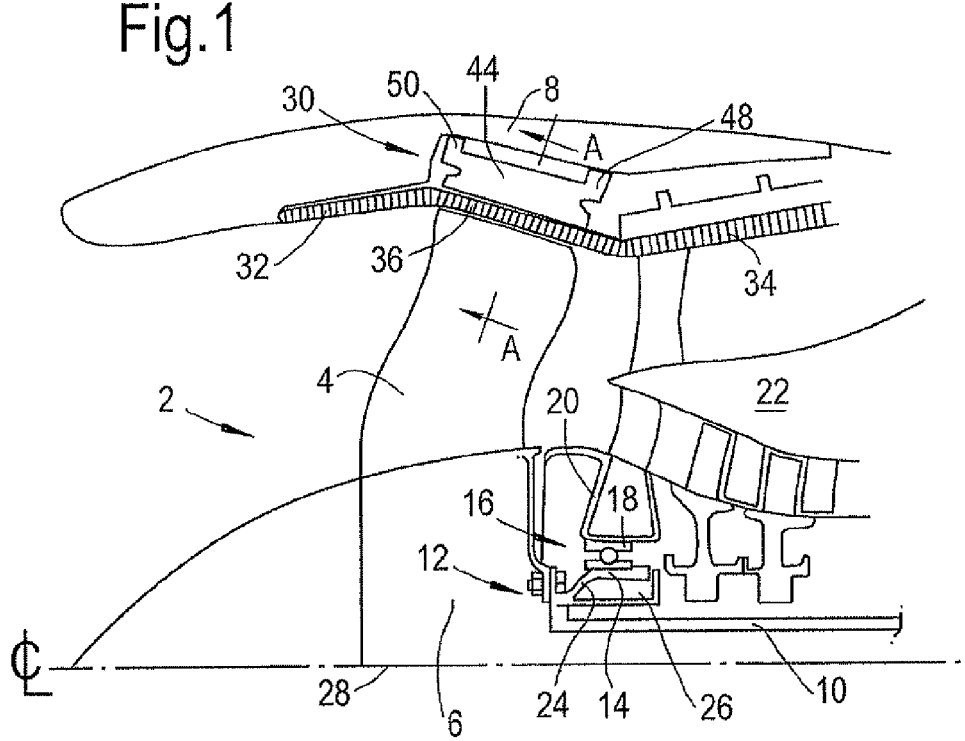

The invention relates to a gas turbine engine casing assembly. In particular the invention concerns the construction of a fan casing for a high bypass ratio turbofan propulsion engine.

A turbofan gas turbine aircraft propulsion engine consists of a core engine driving a propulsive fan assembly comprising a multiplicity of fan blades spaced apart around a hub carried at the forward end of the shaft of the low pressure spool assembly of the engine. Because of the size of the fan assembly particular attention is paid in the design to ensuring survival of the engine in the event of foreign object damage to the fan.

The spool assembly is dynamically balanced and the spool shaft is supported by several bearing assemblies, one of which is normally positioned towards the forward end of the fan shaft. The load bearing structure supporting the bearing assembly is designed for an amount of inherent compliance to allow the bearing to deflect under the effects of sudden loads by a small radial amount to accommodate loads generated by a heavy landing for example. Thus, the radial loads can be absorbed without imparting large, damaging loads to the structure of the engine casing, mounting arrangement and nacelle. However, in the event of the loss of one or more of the fan blades the supporting structure must be able to cope with substantially more significant loads. The fan casing is specifically designed to contain a detached blade or blade fragments. Furthermore, the supporting structure is designed to ensure that as far as possible no further damage is caused during the deceleration of the damaged rotating assembly and subsequent windmilling of the engine. Thus to protect the engine and airframe from the initially high out-of-balance loads, a number of frangible points, or structural fuses, are designed into the compliant structure. These joints fail in order to permit a limited amount of additional radial motion of the low pressure spool.

The mechanical structure of the bearing support has a dynamic response to the loads induced during engine operation including a system natural frequency. The sudden increase in loads caused by a blade-off event, by breaking the weak points, changes the system natural frequency. As the low pressure rotor runs down loads and displacement start to rise, heavy interaction between the blade tips and the fan track liner tends to restore the original system natural frequency response but, in turn, this causes a jump in load and displacement. The spool rotates in a sustained windmilling situation in which the spool continues in an orbiting rotation.

However, a problem can exist in situations of the kind described above if the loads persisting during windmilling are too high at a lower frequency to be acceptable for passenger safety and may adversely affect the ability to continue flight. These problems are exacerbated by larger fan systems. Essentially the larger the fan system and the bigger the fan blades, the higher are the residual out-of-balance loads until they become unacceptable. Hitherto the solution has been a trade-off between a larger gap required for the frangible points in the bearing support structure to fracture when required and a smaller gap needed to allow lowest possible windmilling loads thereafter.

The problem is worsened in modern aero engines because they have a larger diameter, wider chord and heavier fan blades and the forward end of the low pressure spool shaft is almost always cantilevered ahead of the forward shaft bearing. Therefore, the dynamic balance of the fan stage is critical to smooth operation and integrity of the whole engine. If the fan stage sustains damage sufficiently serious to disturb the dynamic balance of the spool, for example as a result of bird-strike, the resulting out-of-balance effects have potentially catastrophic consequences. In the event of damage the engine is "shut-down", in order to minimise aerodynamic drag, the rotating components are permitted to continue to rotate in a condition known as "windmilling". Although fuel supply to the affected engine is immediately discontinued, so it produces no further forward thrust, the rotating parts contain a substantial amount of kinetic energy which takes some time to dissipate and afterwards the engine continues to rotate driven by the momentum of the relatively moving airstream. The loss of all or part of one or more fan blades in a fan stage continuing to rotate at high speed represents a severe threat to the integrity of the engine, and ultimately the whole aircraft. A typical windmill speed is of the order of 800 revolutions per minute (rpm) compared with a maximum speed at take-off and initial climb of up to about 3000 rpm. Thus, it will be appreciated that a rotor unbalanced by damage or loss of one or more fan blades is subject to substantial disruptive loads which act to displace the rotor and can cause significant, even catastrophic, vibrations.

It is known to contain the effects of out of balance loads by allowing the fan shaft to make limited radial movements away from its normal operating position. Commonly owned earlier published U.S. Pat. Nos. 3,910,651 and 3,901,557 describe arrangements in which a bearing support is constructed to support the shaft bearing in a nominal position under all normal operating loads. However, portions of the bearing support structure are designed to break or deform when subject to a radial load exceeding a threshold limit to permit the bearing, and thus the shaft, to make limited radial excursions from the nominal position. This limited movement is termed a "snubber gap", further movement greater than this gap is constrained, and movement within the limits may be damped.

However, a problem arises with such out of balance containment arrangements when used in conjunction with the latest, very wide fan blade systems because the greater weights of the fan blades has increased the out of balance loads to potentially destructive levels not only at the point of initial blade shedding but also during the run down and windmilling phases. Therefore needs exist on one hand to contain the greater size and weight of failed blade fragments but also to ensure that the forces exerted by the surviving parts of the rotating engine spools remain within acceptable limits.

U.S. Pat. No. 5,188,505 deals with a blade fragment containment arrangement for low aspect ratio fan blades while minimizing the weight of the containment system. In a containment system of the type referred to the rotating fan stage is encircled by a containment housed within the outer engine casing. In the event of a "blade off" incident centrifugal forces cause detached blade fragments to impact the fan case liner. Immediately behind, that is radially outside, the liner there is a containment region where the fan blade fragments are captured to prevent them impacting further, downstream engine stages. This containment region is located within the load carrying engine casing so the size of the casing has to be large enough to accommodate the size of the blade fragments. As a result in order to accommodate very wide chord fan blade fragments an engine casing with such a containment system would be unacceptably large and heavy. The solution proposed in this earlier patent is to break up large blade fragments into smaller fragments thereby reducing the kinetic energy of the fragments and enabling them to be captured within a smaller sized containment region. To achieve the break up of blade fragments at least one structural ring is connected to the containment housing, which in effect forms part of the load carrying engine casing, or directly to the engine casing. The radially inner lip of the structural ring, or rings, extend into the nesting area of the containment region so as to cause the further break up of impacting blade fragments. The invention described therein, however, has no interaction with the surviving parts of the fan rotor and therefore does not address the problem caused by the increased out of balance loads.

The present invention has for a major objective to provide a solution to the above problem of achieving a practical compromise between the conflicting clearance gap requirements.

According to the present invention there is provided a gas turbine engine fan assembly comprising a multiplicity of fan blades carried on a hub at one end of a shaft mounted in a bearing assembly carried by a support structure, encircling the fan blades a containment system adapted to capture fan blades or parts thereof in the event they become detached from the hub, and an annular fan track liner positioned between the containment system and a track normally swept by the tips of the rotating fan blades, and located a predetermined distance beyond the surface of the fan track liner there is at least one severance member positioned to intercept and remove a portion of the tip of a blade in the event of the blade penetrating the surface of the liner more than said predetermined distance.

Preferably the arrangement includes a plurality of severance members spaced apart equidistantly around the fan track liner.

Furthermore the or each severance member may be disposed in a direction parallel or thereabouts to the direction of the shaft.

Figure 2:
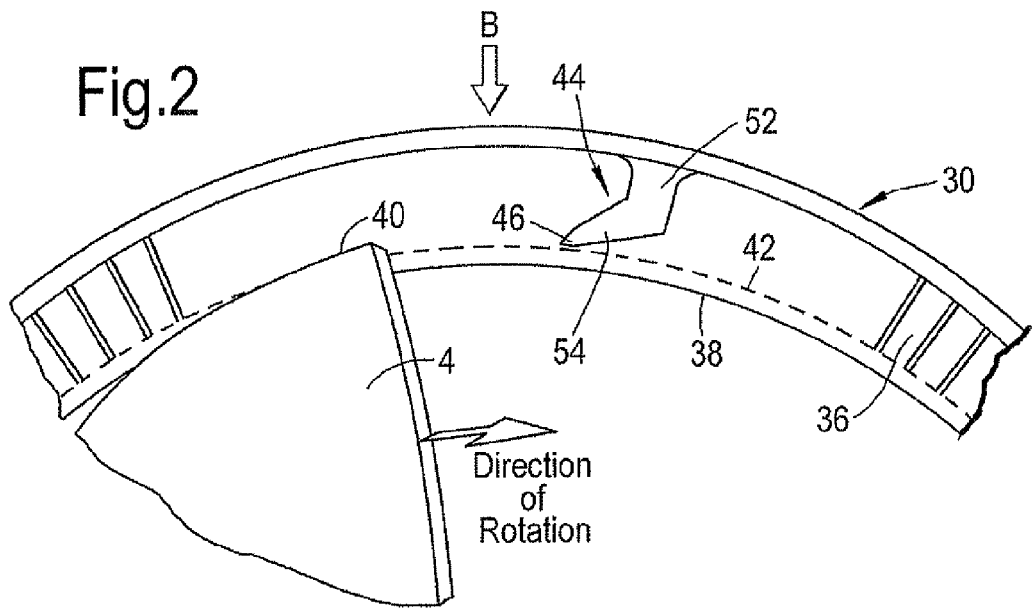
Figure 3:
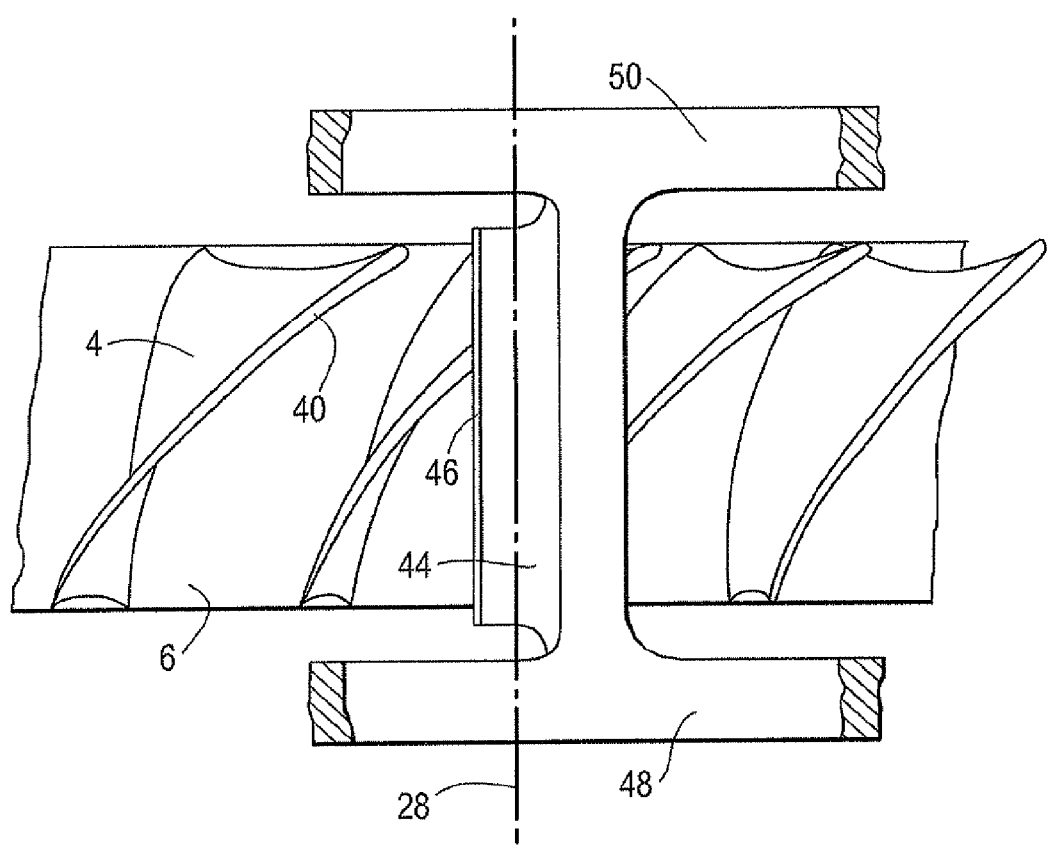

For a better understanding of the invention and how it may be carried into practice, a particular embodiment is described in greater detail in the following with reference to the accompanying drawings, in which:

FIG. 1 shows a partly cutaway, axial half-section on a radial plane through the fan stage of a wide chord fan blade gas turbine engine, FIG. 2 shows a detail of the fan stage on section A-A of FIG. 1 viewed in an axial direction, and FIG. 3 shows a view of FIG. 2 in the direction of arrow B.

The axial section of FIG. 1 illustrates a typical configuration of a modern very high bypass ratio turbofan propulsion engine having a fan stage composed of very wide chord blades. In the drawing only the fan assembly and surrounding structure is illustrated, the remainder of the engine being omitted for clarity. The fan assembly (2) comprises an array of fan blades (4) mounted around the periphery of a fan disc (6). Encircling the array of fan blades (4) is a fan casing (8) which includes a containment arrangement to capture any part of a fan blade released from the assembly (2). The fan blades (4) are spaced apart equidistantly around the fan disc (6) which is attached to a shaft (10) to form, together with a low pressure turbine (not shown), a low pressure spool. The fan disc (6) is secured to the forward end of shaft (10) by a bolted flange joint (12). This assembly is supported towards the forward end of the shaft by an inner race (14) of a bearing (16). The outer race (18) of bearing (16) is carried in a bearing support structure generally indicated at (20), which in turn is secured to forward end of the engine casing (22). The engine is attached to a load bearing pylon (not shown) secured to the engine casing (22) so that loads from the bearing (16) amongst others are transferred into an airframe through the pylon.

The shaft (10) and fan disc (6) are carried in the inner bearing race (14) by a support structure (24) that includes frangible components. It will be understood that the structure of these bearing supports, in reality, is generally annular in form. Thus they may comprise a plurality of frangible components spaced apart around the bearing support structure to provide the required freedom of movement of the supported components in the event of being brought into operation. These frangible parts are designed to fracture under predetermined loads, in excess of normal operating loads but which could arise for example as the result of a bird strike on a rotating fan assembly or due to an extremely heavy landing. In the event of the frangible component being fractured a degree of freedom, in the form of snubber gap (26), is introduced into the bearing support structure (24) thus permitting the shaft (10) to orbit around its normal axis of rotation that is the centre line (28) of the engine.

In order to capture released fan blades and fragments thereof the fan casing (8) is provided with a containment arrangement indicated generally at (30) around the outside perimeter of the fan assembly (2). The purpose of the containment arrangement is to capture and retain within its casing in the fan section of the engine parts released from the fan rotor. In the vicinity of the fan rotor the interior surface of the casing (8) is lined with a plurality of panels (32, 34, 36). The panels (32, 34) immediately in front of and behind the plane of the rotor primarily serve to absorb acoustic emissions generated by the rotating fan. Encircling the fan rotor, immediately adjacent the tips of the fan blades (4) is the containment arrangement (30). This section of the casing surface includes a plurality of fan track liner sections (36) mounted end to end, and the inner surfaces (38) of which form the outer gas path surface of the fan case. The fan rotor is designed to run in normal operation with a small overtip clearance gap between the end surfaces (40) of fan blades (4) and the inner surface (38). These fan track liner sections (36) are constructed with a layer of abradable material adjacent the fan blade tips (40). In practice component dimensions and initial build clearances are chosen such that during early engine runs the fan blade tips (40) rub a track (42) into the abradable material.

In the event of a blade off incident the released blade or fragment penetrates a liner (36) and is captured by the energy absorbing parts of the containment arrangement. The containment casing must be capable therefore of absorbing the energy of a complete fan blade (4) without releasing the blade fragments. Containment system weight is a function of the cube of the diameter of the fan rotor, so a modern high bypass ratio engine with a large fan blade tip-to-tip diameter embodies a much heavier containment system compared to older engines with smaller fans.

In addition to providing a containment system, the fan case normally is part of the structure employed to mount the engine on the airframe, and provides mounting for various components and engine accessories. Thus, it is an important function of the overall engine design to manage the loads imposed in the event of a blade-off event. Although the engine is "shut down" after such an event, that is the supply of fuel is cut off, the engine continues to rotate driven by the passage of the airstream through the engine, a condition known as "windmilling". A certain amount of vibration arising from the continued rotation of an unbalanced rotor is therefore inevitable, and the engine design should ensure that these consequential vibrations do not reach levels that subsequently would endanger the safety and integrity of the aircraft.

As previously mentioned to protect the engine and airframe from initial high out of balance loads, the support structure (20, 24) incorporating the front bearing (16) has frangible parts (24) which fail to permit a limited amount of radial motion of the fan rotor and shaft within the limits of the snubber gap (26). A rotor missing a blade, or part thereof, will possess a revolving out of balance load which will induce severe vibration related to its angular momentum. By changing the natural response frequency of the support structure, and providing the snubber gap (26) is large enough, the induced loads will be reduced. If the snubber gap is not sufficiently large or if the radial displacement of the rotor is greater than the snubber gap, damping effects will be lost. As the rotational speed of the fan rotor (2) and shaft (10) runs down the radial displacement rises to the limits permitted by size of the snubber gap (26) and the original system natural frequency will be restored causing a jump in load and displacement. Providing these loads are contained the integrity of the remainder of the rotor and shaft will be maintained and the assembly will slow down to windmilling speed, and rotation driven by the airstream will be sustained during a fly-home phase.

Without the orbiting motion permitted by the introduction of the snubber gap (26) the windmilling condition would involve far higher load as the natural frequency response peaks. The effect of the snubber gap (26) is to alter the natural frequency response of the mechanical bearing support system once the frangible parts have fractured. However, a problem with this kind of arrangement is that the loads exerted during the windmilling phase at the lower rotational speed may still be unacceptable from a comfort and safety viewpoint. This situation would be improved by a smaller snubber gap, but this would conflict with a requirement for the largest possible gap immediately after blade release at a higher rotor speed. The choice of snubber gap size is therefore a compromise initially. Unfortunately the situation becomes worse with larger diameter fan rotors because of the increased out of balance loads. The present invention seeks to resolve this dilemma by attempting to correct, or at least reduce out of balance loads by deliberately removing, or trimming, the tips (40) of some of the fan blades (4).

FIGS. 2 and 3 of the accompanying drawings show a preferred arrangement for trimming the fan blade tips (40) in order to improve the dynamic balance of a damaged fan rotor. The trimming action is carried out by a cutting rib or severance member (44) positioned just radially outside the locus of the normal running track (42) of the fan blade tips (40). There may be a plurality of severance members (44) spaced apart, preferably equidistantly, around the annulus of the fan casing. The or each severance member (44) has a cutting edge (46) formed on the side facing towards the direction of rotation of the fan rotor. The cutting edge (46) is located sufficiently close to impact the tips (40) of fan blades (4) making severe inroads into the surface (38) of a fan track liner (36). In the event of a fan blade off event occurring the frangible component or components in the shaft support structure (24) fail, protecting the greater structure of the engine. The rotating unbalanced rotor has two major components of motion: a first being its rotation about the axis of the shaft (10), and a second being the orbiting of the shaft about the centre line (28) to the limits permitted by the snubber gap (26). As a result of the orbiting motion some of the fan blade tips (40) will make deeper incursions into the fan track liner (36) than the depth of the normal fan track (42) and to a depth sufficient to impact the cutting edge (46) of a severance member (44).

FIG. 3 shows a view partly cut-away in a radial direction to illustrate the location and support of a severance member (44). The construction of the fan casing (8) includes concentric, annular ribs (48, 50) which run around the entire perimeter of the containment casing and are designed to withstand the forces arising during a blade off event. The severance members (44) are carried by ribs (48, 50) on the radially inner sides thereof, that is on the side nearer the fan rotor. The members (44) may be formed integrally with the load carrying ribs (48, 50) or may be formed separately and attached thereto. If formed integrally the severance members (44) will comprise the same material as the ribs (48, 50). However, if formed separately they may comprise a different material, for example a harder material, that may be preferred to provide the cutting edge (46). In another variant the cutting edge (46) is formed separately to the remainder of the severance member (44) and is attached thereto and again the separate edge piece may comprise a harder material to provide the cutting edge.

The or each of the severance members (44) are oriented to provide the most effective trimming action. Generally it is preferred to adopt an approximately fore and aft orientation for the impact edge of a severance member, that is the edge is approximately parallel to the engine centre line (28, FIG. 1). The exact position and angle for the edge (46) is dependent on several factors, in particular the relative alignment of the tip of the fan blade with the cutting or shearing edge. Normally the chord of the blade at the tip is skewed relative to the engine centre line because of the twist designed into the blade profile. This provides a natural skew of the blade tip relative to the cutting edge (46). Therefore a cutting edge (46) parallel to the engine centre line (28) is a starting point from which the effectiveness of the shearing action achieved may be assessed. However, care must be taken with containment analysis to avoid setting an angle for the cutting edge (46) which might propel a severed blade portion fore or aft of the containment case.

In the illustration in FIG. 3 there is shown a portion of the fan hub (6) and several fan blades (4) passing under the severance member (44). The twist of the fan blades (4) relative to cutting edge (46) as mentioned above is clearly shown and also that the cutting edge (46) is parallel to the engine centre line (28). In this arrangement the severance member (44) is formed with a stout shank portion (52) extending between the rings (48, 50). The shank portion (52) is disposed on the underside, that is on the radially inner side, of the rings and extends radially inwards a short distance where it is formed into a tapered portion (54) facing towards the direction of rotation of the blades (4). The distal end of portion (54) is formed with the cutting edge (46) at its extremity.

In this example the cutting edge (46) is formed directly on the tapered portion (54) of the body of the severance member (44). The structural parts of the containment casing (30), in particular the rings (48, 50), comprise titanium. As an integral part of the rings the severance members (44) are also comprised of titanium. It is envisaged that the severance members would be effective to trim the tips of fan blades comprising hollow, thin skinned titanium or solid composite material. However, if required the cutting edge (46) may be provided on a separate demountable part secured to the shank (52) of the severance member (44). Alternatively the whole severance member (44) may be made separately of a different material and mounted on the structural rings (48, 50). This would allow for the cutting edge to be formed of a harder material providing, of course, the material is not too brittle for the intended purpose. Choice of the optimum material and configuration for each installation must be the subject of detail analysis.

Preferably the cutting edge (46) should be capable of surviving contact with the fan blade, and the preferred arrangement is for a plurality of severance members (44) to be provided spaced apart equidistantly around the fan annulus. The amount of material removed from a blade tip upon contact with a severance member is determined by the out of balance displacement of the fan rotor. Therefore, the severance members should survive initial contact and remain capable of further trimming action in subsequent contact with a blade tip. Ideally the removal of mass from one or more fan blades would be instantaneous, but it is more likely to be achieved in several bites. It is likely that several contacts will occur of one or more blades as they impact in sequence with several severance members around the fan annulus. Impacts could occur immediately after an initial blade release, as a result of increased displacement as a rotor slows or both. It is found that rotor displacement quickly goes out of phase with the out of balance load, thus trimming correction may not be complete in a first contact and other blade tips, after the first, may impact on one or more severance members.

The invention is defined by the scope of the following claims and the above description of the invention is given by way of example only, further modifications and variations within the scope of the claims may be constructed.

The invention claimed is:

1. A gas turbine engine fan assembly comprising a multiplicity of fan blades carried on a hub at one end of a shaft mounted in a bearing assembly carried by a support structure, encircling the fan blades a containment system adapted to capture fan blades or parts thereof in the event they become detached from the hub, and an annular fan track liner positioned between the containment system and a track normally swept by the tips of the rotating fan blades, wherein there is located a predetermined distance beyond the surface of the fan track liner at least one severance member positioned to intercept and remove a portion of the tip of a blade in the event of the blade penetrating the surface of the liner more than said predetermined distance, and wherein a severance member has a cutting edge facing into the direction of rotation of an incident fan blade.

2. A fan assembly as claimed in claim 1 wherein a plurality of severance members are equidistantly spaced apart around the fan track liner.

3. A fan assembly as claimed in claim 2 wherein a severance member is disposed in a direction parallel or thereabouts to the centre line of the engine.

4. A fan assembly as claimed in claim 1 wherein the cutting edge is formed on a part demountable from the remainder of the severance member.

5. A fan assembly as claimed in claim 1 wherein a severance member is formed integrally with the structure of the fan casing.

6. A fan assembly as claimed in claim 1 wherein a severance member is formed as a separate member and fixed to the structure of the fan casing.

7. A fan assembly as claimed in claims 4 wherein a cutting edge of a severance member is formed of a harder material than another part of the severance member.

* * * * *